United States Patent [19]

Halasa et al.

[11] 4,198,496
[45] Apr. 15, 1980

[54] PROCESS FOR POLYMERIZING BUTADIENE

[75] Inventors: Adel F. Halasa, Bath; James E. Hall, Akron, both of Ohio

[73] Assignee: The Firestone Tire & Rubber Company, Akron, Ohio

[21] Appl. No.: 869,334

[22] Filed: Jan. 13, 1978

[51] Int. Cl.$^2$ .......................... C08F 4/70; C08F 36/06
[52] U.S. Cl. .................. 526/115; 252/429 C; 252/431 C; 526/124; 526/125; 526/340.4
[58] Field of Search ............ 252/429 C, 431 C; 526/115, 124, 125

[56] References Cited

U.S. PATENT DOCUMENTS

| | | | |
|---|---|---|---|
| 3,546,133 | 12/1970 | Ziegler et al. | 526/169.1 |
| 3,642,760 | 2/1972 | Baekelmans et al. | 526/124 |

FOREIGN PATENT DOCUMENTS

| | | | |
|---|---|---|---|
| 1958488 | 5/1970 | Fed. Rep. of Germany | 526/125 |
| 841822 | 7/1960 | United Kingdom | 526/124 |
| 1314053 | 4/1973 | United Kingdom | 526/114 |
| 1358437 | 7/1974 | United Kingdom | 526/124 |

*Primary Examiner*—Edward J. Smith

[57] ABSTRACT

1,3-Butadiene is polymerized in hexane solution in the presence of a catalyst composition comprising:
 (a) A hexane-soluble cobalt component;
 (b) A reducing agent comprising $RAlX_2$ wherein R is a hydrocarbyl radical of 1–8 carbon atoms, and X is halogen; and
 (c) $MgCl_2$, $MgBr_2$, $MnCl_2$, $MnBr_2$ or a Mg or Mn salt of a carboxylic acid having 12–25 carbon atoms.

The cobalt component may be a cobalt salt of a carboxylic acid or thiocarboxylic acid having at least six carbon atoms or a hexane-soluble complex of a cobalt salt with an oxygen-containing or nitrogen-containing group either in the same salt molecule or in a separate compound. Typical aluminum hydride or hydrocarbyl dihalides that may be used are aluminum hydride dichloride, ethyl aluminum dichloride, butyl aluminum dibromide, etc. Butadiene polymers having a high cis-1,4 and low 1,2 contents are obtained in high yield, and it is possible to produce high molecular weight polymers without the gel formation often accompanying such high molecular weight polymers.

25 Claims, No Drawings

PROCESS FOR POLYMERIZING BUTADIENE

BACKGROUND OF THE INVENTION

1. Field of the Invention

This invention relates to a process for the preparation in hexane or related saturated aliphatic hydrocarbon of a polybutadiene having at least 70% cis-1,4 and less than 10% 1,2 microstructure. More specifically, the process involves the polymerization of 1,3-butadiene in the presence of a novel catalyst composition.

2. Related Prior Art

Halasa U.S. Pat. No. 3,993,856 describes the polymerization of butadiene to high cis-1,4 polymers using a catalyst composition comprising (a) a cobalt component, (b) an $RAlX_2$ reducing component wherein R is H or hydrocarbyl, and X is halogen, and (c) $CS_2$. In column 2, lines 3-13, reference is made to the fact that aromatic solvents, such as benzene and toluene, are preferred and that while aliphatic solvents, such as hexane, etc., may be used, the cis content of the product is decreased by their use. Moreover, lines 14-24 point out that even with aromatic solvents, the cis-1,4 content drops off when the polymerization temperature is above 40° F.

Because of its toxicity the $CS_2$ modifier is difficult and dangerous to use and requires expensive precautions to avoid even minimal amounts escaping into the atmosphere. Moreover, benzene and toluene are also toxic and it would be preferable to use the less toxic hexane as a solvent both for its decreased toxicity and because of the lower expense involved in its recovery and reuse.

U.S. Pat. No. 3,203,945 shows in its Example III (Cols. 8 and 9) that when heptane is substituted for toluene as the solvent in similar polymerizations using dipyridinocobaltous chloride and ethyl aluminum dichloride, the conversion is 10% less and the molecular weight of the product is much lower than when toluene is used.

U.S. Pat. No. 3,135,725 in a general description of solvents makes reference to hexane and heptane but uses only benzene and xylene in its examples and thereby implies that they are preferred probably for the reasons shown in U.S. Pat. No. 3,203,945.

U.S. Pat. No. 3,066,127 in describing a similar process, shows a preference for aromatic solvents and only refers to aliphatic hydrocarbons as being suitable when used in combination with aromatic or cycloaliphatic hydrocarbons.

It is desirable therefore that a polymerization system suitable for use in hexane or related saturated aliphatic hydrocarbon should be developed for the production of satisfactory high cis-1,4 polybutadiene in high yields to avoid the toxicity, dangers and expense involved in the use of benzene, toluene, $CS_2$, etc.

SUMMARY OF THE INVENTION

In accordance with the present invention it has been found that polybutadiene of high cis-1,4, low 1,2 content and other desirable properties may be produced by polymerization of butadiene in a hexane or related aliphatic hydrocarbon medium by the use of a catalyst composition comprising:

(a) A hexane-soluble cobalt component;
(b) A reducing agent comprising $RAlX_2$ wherein R is a hydrocarbyl radical of 1-8 carbon atoms, and X is halogen; and
(c) $MgCl_2$, $MgBr_2$, $MnCl_2$, $MnBr_2$ or a Mg or Mn salt of a carboxylic acid having 12-25 carbon atoms.

The hexane soluble cobalt component may be a cobalt salt of a carboxylic acid or thiocarboxylic acid having at least six carbon atoms, preferably at least eight carbon atoms, or a hexane-soluble complex of a cobalt salt, with an oxygen-containing or nitrogen-containing group in the same salt molecule or in a separate compound.

Typical of the cobalt salts that may be used in the catalyst system of this invention are both cobaltous and cobaltic salts such as Co dihexoate, Co dioctoate, Co dinaphthenate, Co dibenzoate, Co dinaphthoate, Co dithiodioctoate, Co bis(mercaptobenzothiazole), Co distearate, Co dioleate, etc.

Also useful are salts of carboxylic and thiocarboxylic acids which also contain keto or thioketo or nitrogen groups therein with which the cobalt may be complexed in addition to being attached as a salt component. These are referred to herein as salt-complexes. Typical nitrogen groups that may be present for such complexing purposes are: primary, secondary or tertiary amino groups, i.e., $-NH_2$, $-NH-$ or $>N-$ respectively; the aldimino group, $-CH=NR'-$, the ketimino group, $>C=NR'$, the nitro group, $-NO_2$, and the nitroso group, $-N=O$, etc., wherein R' is hydrogen or a hydrocarbon group as defined above for R.

Preferred among the salt-complex formers are the aminoacids such as:
picolinic acid, $C_5H_{10}N(COOH)$;
glycine, $NH_2CH_2COOH$;
alanine, $CH_3CH(NH_2)COOH$;
aminobutyric acid, $CH_3CH_2CH(NH_2)COOH$;
theronine, $CH_3CH(OH)CH(CH_2)COOH$;
norvaline, $CH_3CH_2CH_2CH(NH_2)COOH$;
valine, $(CH_3)_2CHCH(NH_2)COOH$;
methionine, $CH_3SCH_2CH_2CH(NH_2)COOH$;
laucine, $(CH_3)_2CHCH_2CH(NH_2)COOH$;
aspartic acid,

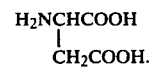

N,N-dimethyldithiocarbomic acid, $(CH_3)_2NCSSH$; N-acetylanthanilic acid, $o-CH_3CONHC_6H_4COOH$; mercaptobenzothiazole,

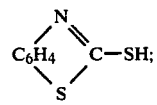

hippuric acid, $C_6H_5CONHCH_2COOH$;
glutamic acid,

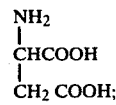

lysine, $NH_2(CH_2)_4CH(NH_2)COOH$;
1,2 diaminopropionic acid, $NH_2CH_2CH(NH_2)COOH$;
aminopilemic acid, $HOOC(CH_2)_4CH(NH_2)COOH$:
betaaminovaleric acid, $CH_2CH_2CH(NH_2)CH_2COOH$;
2,6-diamino-4-hydroxy-caproic acid, $NH_2CH_2CH(OH)CHCH_2CH(NH_2)COOH$;
hydroxyethyl glycine, $HOCH_2CH_2NHCH_2COOH$;

aminoethyl glycine, $NH_2CH_2CH_2NHCH_2COOH$;
imidodiacetic acid, $NH(CH_2COOH)_2$;
iminodipropionic acid, $NH(CH_2CH_2COOH)_2$;
aminoethyliminoacetic acid, $H_2NCH_2CH_2N(CH_2COOH)_2$;
hyroxyethyliminediacetic acid, $HOCH_2CH_2N(CH_2COOH)_2$;
hydroxypropyliminodiacetic acid, $HO(CH_2)_3N(CH_2COOH)_2$;
as well as 3-aminotyrosine, canavanine, 3-4-di-hydroxylphenylalanine, ethonine, ethonine sulfone, citrulline, creatine, cysteic acid, cystine, dibromothyronine, glycocyanine, histidine, homocystine, hydroxyproline, methylhistidine, pennicillamine, pyroglutamic acid, thienylalanine, carboxymethyl aspartic acid, etc.

Amino acids preferred in the practice of this invention are the aliphatic aminoacids having no more than about 20 carbon atoms therein, and preferably having an amino group separated from a carboxylic group by no more than 2 carbon atoms. The aminoacids and their derivatives can have a plurality of amino and carboxylic groups therein and also can contain other functional groups therein which do not interfere with and in some cases even may enhance, the complexing or chelating tendencies of the compound.

Generally the salt is formed which has two acid groups attached to one cobalt atom and the cobalt is furthermore complex or chelated with the nitrogen.

It is also advantageous, particularly where it is desired to have the cobalt component in solution, to use complexing agents in which the keto, thioketo or nitrogen-containing group is in a separate compound. Suitable compounds for this purpose include beta-diketones of the formula.

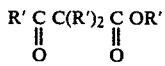

wherein R' is as defined above. Typical examples of these are acetylacetone and ethyl acetoacetate which form complexes with cobalt salts.

Nitrogen-containing compounds are those which contain the various nitrogen-containing groups listed above for the salt-complex formers. Other complexing compounds may be used in which the complexing group is in a separate compound. Particularly preferred complexing agents for this purpose are compounds containing nitrogen and oxygen or sulfur, preferably with no more than 2 carbon atoms separating the nitrogen from the oxygen or sulfur. Typical of these are: N-methylpyrrolidone, caprolactam, pyrrolidone, o,m or p-aminoacetophenone, o,m or p-aminobenzophenone, N-methylaminoacetophenone, N,N-dimethylaminoacetophenone, N-methyl-aminobenzophenone, 2-aminocyclohexanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

When the complexing agent is a separate compound, the Co compound may be one of the soluble carboxylates or thiocarboxylates described above or may be a cobalt compound which by itself may be insoluble in hexane but is soluble when complexed such as the halides, lower carboxylates, lower thiocarboxylates, carbonates, thiocarbonates, etc., e.g. $CoCl_2$, $CoCl_3$, $CoBr_2$, $CoBr_3$, $CoI_2$, $CoI_3$, $CoF_2$, $CoF_3$, Co carbonate, Co diacetate, $CoCO_3$, Co diformate, Co dipropionate, Co thiocarbonate, Co bis (dithioacetate), etc.

When a separate compound is used to form a cobalt complex for the catalyst composition of this invention, such complex former may be used in a proportion of 1-30 moles per mole of cobalt compound, preferably 1-16 moles when a pyrrolidone is used and 1-6 moles when a lactam is used. In the carboxylates and thiocarboxylates used herein, it is generally not necessary to have more than 20 carbon atoms in such compounds.

The reducing agents that may be used in the practice of this invention comprise monohydrocarbon aluminum dihalides. Alkyl groups of 1-8 carbon atoms are preferred in the above compounds but even larger hydrocarbon groups or aromatic or cycloaliphatic hydrocarbon groups such as decyl, dodecyl, phenyl, tolyl, xylyl, diphenyl, napthyl, cyclohexyl, cycloheptyl, etc., may also be present in place of the alkyl group in the respective compounds. Moreover while the chlorides are preferred as the halide group, the corresponding bromides, iodides and fluorides may also be used.

Typical aluminum dihalides that may be used include: methyl aluminum dichloride, ethyl aluminum dichloride, propyl aluminum dichloride, butyl aluminum dichloride, amyl aluminum dibromide, hexyl aluminum diiodide, octyl aluminum difluoride, methyl aluminum diiodide, ethyl aluminum dibromide, hexyl aluminum dibromide, propyl aluminum diiodide, phenyl aluminum dichloride, cyclohexyl aluminum dichloride, tolyl aluminum dichloride, napthyl aluminum dichloride, cycloheptyl aluminum dibromide and the like.

An important advantage of the present invention is the fact that there is an elimination or a drastic reduction of gel formation in the production of high molecular weight polymers. In the absence of the $MgX_2$ or $MnX_2$ used in the catalyst composition of this invention there is generally a substantial amount of gel formed in the production of high molecular weight polymers.

When the $MgX_2$ or $MnX_2$ portion of the catalyst composition is initially insoluble or suspended in the polymerization medium, there is generally an induction period during which the polymerization rate is very slow. Then as the $MgX_2$ or $MnX_2$ becomes dissolved, the polymerization speeds up to a fast rate. If the $MgX_2$ or $MnX_2$ is first complexed or reacted with a salt of an aliphatic carboxylic acid of 12-25 carbon atoms, preferably one having one or two ethylenically unsaturated groups therein, such as oleic acid, the complex is immediately dissolved and the polymerization proceeds immediately at a fast rate without an induction period.

The following general procedures are used in preparing the catalyst compositions. $MgBr_2$ is used to illustrate the procedure but equivalent amounts of $MgCl_2$, $MnBr_2$, and $MnCl_2$ may be used instead.

CATALYST PREPARATION (I) A solution of anhydrous $MgBr_2$ is prepared in tetrahydrofuran, ether or ethanol and a dilute solution of cobalt bis(neodecanoate) in hexane is also prepared. Into a 10-ounce bottle capped with a rubber membrane through which reagents may be injected there are injected 0.5 millimoles of the cobalt bis(neodecanoate) and 1.0 millimoles of the $MgBr_2$, each in the above prepared solutions. Then 50 ml. of dry hexane is added. The $MgBr_2$ solvent is removed by passing a stream of nitrogen by means of a hollow needle extending through the cap into the bottle and the exit stream of gas passing out through a second hollow needle passed through the cap, while the solution is heated in a hot water bath. When the solution volume has been reduced to about half, it may be assumed that all of the polar solvent has been removed. The resultant dispersion of cobalt di(neodecanate)-2MgBr$_2$ has a greenish cast. This is diluted to 100 ml. total volume by the addition of hexane.

(II) To prepare the catalyst composition in solution form, Mg oleate is prepared by reacting one mole of Na oleate in aqueous solution with 0.5 mole of MgCl$_2$ or MgBr$_2$. The Mg oleate precipitates from solution, and after separation and drying, it is dissolved in hexane.

Into a 10 ounce bottle, equipped with a membrane cap as above, there are injected 0.5 millimoles of cobalt di(neodecanoate), 2.0 millimoles of Mg oleate and 1.0 millimoles of MgBr$_2$ (in solution as described above). The MgBr$_2$ solvent is removed in the same manner described above in (I). In this case either a portion or all of the hexane may be removed. Then sufficient hexane is added to make 100 ml of solution. The MgBr$_2$ is completely in solution probably as a complex with the Mg oleate. Such solutions have a greenish cast at a concentration of MgX$_2$/Co of 2/1 or more. Variations in the above proportions will give any desired variation in concentrations and Mg/Co ratios.

While the Mg oleate, Mn oleate, or related compound may itself be used as the Mg or Mn salt in the catalyst composition it has been found that the complex prepared in preparation II is more economical and satisfactory for this purpose, and yields higher molecular weight polymers.

It has also been found that the Mg oleate, or related carboxylates described above, may be used to solubilize insoluble Co salts. For example, CoCl$_2$ may be solubilized with Mg oleate in anhydrous alcohol. The alcohol may then be evaporated and the residue dissolved in hexane to give a Co solution useful as a catalyst component in the process of this invention.

The Mg and Mn carboxylate salts are advantageously the Mg and Mn dicarboxylates although the MgX monocarboxylates and MnX monocarboxylates may also be used. Typical carboxylates are the oleates, palmitates, pentadecanoates, myristolenates, palmitolenates, petroselate, erucate, brassidate, nervonate, linoleate, linolenate, stearate, etc.

The Mg and Mn carboxylate salts are prepared by reacting MgX$_2$ and MnX$_2$ in aqueous solution with the sodium salt of the carboxylic acid. The Mg and Mn carboxylate precipitates and is separated and dried before being being dissolved in hexane. With one mole of MgX$_2$ and MnX$_2$ and two moles of Na carboxylate, the Mg or Mn dicarboxylate is formed, such as Mg(oleate)$_2$.

In preparing the complexes of MgCl$_2$, MnBr$_2$, CoCl$_2$, etc., with the Mn or Mg oleate, etc., there needs to be added only enough of the Mn or Mg carboxylate to give solubility in the desired solvent such as hexane. Generally about two moles of Mn or Mg carboxylate per mole of MgX$_2$ or MnX$_2$ is satisfactory for this purpose although as little as 0.25 mole or as much as 10 moles of carboxylate may be used for this purpose. Reducing agents that may be used in the practice of this invention include hydrocarbyl aluminum dihalides. Alkyl groups of 1-8 carbon atoms are advantageous in the above compounds but even larger groups or carbocyclic aromatic or cycloaliphatic groups such as phenyl, tolyl, xylyl, naphyhyl, cyclohexyl, cycloheptyl, etc., may also be present in place of the alkyl groups in the respective compounds. Hydrocarbyl groups of at least 3 carbon atoms are advantageous, preferably at least 4 carbon atoms, aluminum compounds having less than three carbon atoms require much lower temperatures than required with higher R groups to give practical yields of polymer product.

The polymerization is advantageously effected in the presence of 60-95%, preferably 75-90% of hexane to facilitate handling of the polymer and to give better temperature control. In referring to "hexane" it is intended to include any of the various hexane isomers, such as n-hexane, isohexane and the various other isomers, either individually or as mixtures with each other. Commercial hexane mixtures containing predominantly hexane are suitable. Moreover, while hexane is preferred, related saturated aliphatic hydrocarbons such as heptane and nonane may also be used and are included in generic reference to hexanes.

Polymerization is advantageously conducted in a pressure vessel to avoid loss of monomer and solvent, particularly since temperatures are generally used at or above the boiling point of either or both. Moreover, an inert atmosphere such as nitrogen is used, and the usual precautions are taken to exclude materials such as water and air that will inactivate or poison the catalyst combination.

Conjugated dienes that may be polymerized, either alone or with each other, in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be prepared where the comonomers impart desirable properties and do not detract from the polymer properties. The comonomers may be olefins, such as butene-1, n-butene-2, isobutylene, n-pentene-1, n-pentene-2 and the like, and preferably vinyl arenes, including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m-, and p-Cl-styrene, vinyl napthalene, vinyl ethyl napthalene, vinyl methyl napthalene, vinyl butyl napthalene, isopropenyl napthalene, isopropenyl methyl napthalene, 1-vinyl-4-chloronaphthalene, 1-isopropenyl-5-chloronaphthalene, vinyl diphenyl, vinyl diphenylethane, 4-vinyl-4'-methyldiphenyl, 4-vinyl-4'-chlorodiphenyl, and the like. Preferably such comonomers have no more than 12 carbon atoms. Where such comonomers are to be used, generally at least 1%, preferably at least 5% by weight, should be used and as much as 60%, preferably no more than 30% may be used.

In the polymerizations described in the working examples below, blends of butadiene in hexane are used at concentrations of preferably 10-30% butadiene. The temperature is initially in the range of 32°-104° F. (0°-40° C.) and when polymerization starts, the exotherm raises the temperature rapidly to 104°-212° F. (40°-100° C.). If the polymerization has not proceeded to complete conversion by the time the exotherm subsides, the reaction may be reactivated by adding more Co component. However, polymerization is generally completed within 15 minutes to 6 hours.

In conducting the polymerization, cobalt proportions may be 0.005-1.0, preferably 0.02-0.1 millimoles per hundred grams of monomer (phgm), and RALX$_2$ proportions of 2-10 millimoles (mM) phgm are suitable, preferably 5-6 mM phgm. Mg/Co ratios may be as low as 0.25/1 and as high as 10/1, preferably 0.5/1 to 2/1. The Al/Co ratio may be in the range of 10/1 to 1300/1, preferably 50/1 to 400/1.

Polymerizations are conducted under an inert atmosphere, such as nitrogen, and precautions are taken to exclude materials, such as water and air, that will deactivate or poison the catalyst components.

The polymer product is recovered by dumping the reaction solution into an equal volume or more of isopropanol, preferably containing an antioxidant such as t-butylcresol. The EtAlCl$_2$ is deactivated by reaction with the isopropanol or a small amount of ethanol may be added to the reaction mass. The recovered precipitate is then drum-dried.

The "dilute solution viscosity" (DSV) referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities.

SPECIFIC EMBODIMENTS OF THE INVENTION

The invention is illustrated by the following examples which are intended merely for purpose of illustration and are not intended to be regarded as limiting the scope of the invention or the manner in which it may be practiced. Unless specifically indicated otherwise, parts and percentages are given by weight.

EXAMPLE I

A 1-gallon stainless steel reactor equipped with stirrer, inlet and outlet ports and means for maintaining a nitrogen atmosphere is cleaned, dried and swept out with nitrogen. Then 4 lbs. of a dried blend containing 23% 1,3-butadiene and 77% hexane is introduced into the reactor. A solution containing 6 millimoles phgm of EtAlCl$_2$ in hexane is added. Next there is added a hexane solution prepared by first dissolving varying amounts of MgBr$_2$ and 0.1 millimole phgm of Co bis(-neodecanoate) in ether, evaporating the ether therefrom and dissolving the precipitated complex in hexane. The temperature rises during polymerization to about 55°–75° F. (13°–25° C.). After 2 hours, the polymer is coagulated by dumping the solution into isopropanol, separated and drum-dried. This procedure is repeated a number of times using variations in the amount of MgBr$_2$ with the results shown in the table below. It will be noted that there is a substantial amount of gel in the product from Run A where the MgBr$_2$ is omitted, whereas there is no gel in any of the products where MgBr$_2$ was used. Moreover, the Run A product has a lower yield of polymer, a higher 1,2 content and a lower cis-1,4 content than in the other products.

TABLE

| Run | A | B | C | D |
|---|---|---|---|---|
| Co decanoate (mM/phgm) | 0.10 | 0.10 | 0.10 | 0.10 |
| EtAlCl$_2$ (mM/phgm) | 6.0 | 6.0 | 6.0 | 6.0 |
| Al/Co | 60/1 | 60/1 | 60/1 | 60/1 |
| MgBr$_2$ (mM/phgm) | none | 0.10 | 0.15 | 0.25 |
| Mg/Co | — | 1.0/1 | 1.5/1 | 2.5/1 |
| Polym. Temp (°F.) | 55–63 | 55–65 | 52–64 | 58–73 |
| Polym. Time (Hrs.) | 2 | 2 | 2 | 2 |
| Conversion (%) | 71 | 88 | 85 | 83 |
| DSV | 0.47 | 0.85 | 2.27 | 1.56 |
| Gel (%) | 4.84 | 0.0 | 0.0 | 0.0 |
| Mooney | — | — | 82.5 | 95.9 |
| Microstructure: | | | | |
| 1,2 (%) | 7.1 | 4.7 | 2.5 | 3.2 |
| Trans.-1,4 (%) | 4.2 | 3.3 | 2.1 | 2.3 |
| Cis-1,4 (%) | 88.7 | 92.0 | 95.4 | 94.5 |

EXAMPLE II

The procedure of Example I is repeated using MgCl$_2$ in place of the MgBr$_2$. The conditions and results are shown in the table below:

| RUN | 1001 |
|---|---|
| Co decanoate (mM/phgm) | 0.1 |
| EtAlCl$_2$ (mM/phgm) | 6.0 |
| Al/Co | 60/1 |
| MgCl$_2$ (mM/phgm) | 0.2 |
| Mg/Co | 2 |
| Polym. Temp. (°F.) | 52–62 |
| Polym. Time (Hrs.) | 4 |
| Conversion (%) | 67 |
| DSV | 1.88 |
| Gel (%) | 0.0 |
| Mooney | 69.5 |
| Microstructure: | |
| 1,2% | 1.7 |
| Trans-1,4 (%) | 1.5 |
| Cis-1,4 (%) | 96.7 |

EXAMPLE III

The procedure of Example I is repeated a number of times using Mg oleate in place of the MgBr$_2$. The conditions and results are reported in the table below.

| RUN | 1169 | 1170 | 1173 | 1176 | 1181 | 1182 |
|---|---|---|---|---|---|---|
| Co decanoate (mM/phgm) | 0.10 | 0.10 | 0.10 | 0.10 | 0.10 | 0.05 |
| EtAlCl$_2$ (mM/phgm) | 5.0 | 5.0 | 5.0 | 5.0 | 5.0 | 5.0 |
| Al/Co | 50/1 | 50/1 | 50/1 | 50/1 | 50/1 | 100/1 |
| Mg oleate (mM/phgm) | 0.4 | 0.4 | 0.3 | 0.2 | 0.4 | 0.2 |
| Mg/Co | 4/1 | 4/1 | 3/1 | 2/1 | 4/1 | 4/1 |
| Polym. Temp. (°F.) | 75–219 | 65–207 | 65–207 | 65–191 | 56–192 | 55–188 |
| Polym. Time (Hrs.) | 1 | 1 | 1.25 | 1 | 1.25 | 1 |
| Conversion (%) | 88 | 86 | 86 | 81 | 87 | 90 |
| DSV | 1.06 | 1.27 | 1.23 | 1.13 | 1.38 | 1.45 |
| Gel (%) | 0.0 | 0.0 | 0.0 | 0.0 | 0.0 | 0.0 |
| Mooney | 11.9 | 22.0 | 15.5 | 15.9 | 27.8 | 31.8 |
| Microstructure: | | | | | | |
| 1,2(%) | 11.2 | 9.0 | 9.6 | 7.9 | 8.1 | 6.8 |
| Trans-1,4(%) | 9.6 | 8.2 | 9.0 | 7.8 | 7.6 | 6.5 |
| Cis-1,4(%) | 79.2 | 82.9 | 81.4 | 84.3 | 84.3 | 86.7 |

EXAMPLE IV

The procedure of Example I is repeated except that the MgBr$_2$ is omitted using Mn oleate in place of the MgBr$_2$. The conditions and results are reported in the table below:

| Run | 1198 |
|---|---|
| Co decanoate (mM/phgm) | 0.05 |
| EtAlCl$_2$ (mM/phgm) | 5.0 |
| Al/Co | 100/1 |
| Mn oleate (mM/phgm) | 0.2 |
| Mn/Co | 4/1 |
| Polym. Temp. (°F.) | 55–153° |
| Polym. Time (Hrs.) | 2 |
| Conversion (%) | 95 |
| DSV | 1.45 |
| Gel (%) | 0.0 |
| Mooney | 25 |
| Microstructure: | |
| 1,2 (%) | 5.8 |
| Trans-1,4 (%) | 5.3 |
| Cis-1,4 (%) | 88.9 |

EXAMPLE V

The procedure of Example I is repeated a number of times using various amounts of other salts in place of the MnBr$_2$. The conditions and results are reported in the table below. These results show that these salts are much less effective than the Mg and Mn chlorides, bromides and oleates.

| RUN | 929 | 934 | 971 |
|---|---|---|---|
| Co decanoate (mM/phgm) | 0.10 | 0.10 | 0.10 |
| EtAlCl$_2$ (mM/phgm) | 6.0 | 6.0 | 6.0 |
| Al/Co | 60/1 | 60/1 | 60/1 |
| CaBr$_2$ | — | — | 0.25 |
| LiBr (mM/phgm) | 0.2 | — | — |
| LiI (mM/phgm) | — | 0.2 | — |
| Salt/Co | 2/1 | 2/1 | 2.5/1 |
| Polym. Temp. (°F.) | 50° | 50° | 55–60° |
| Polym. Time (Hrs.) | 4 | 4 | 5 |
| Conversion (%) | 62 | 46 | 57 |
| DSV | Liquid | Liquid | 1.11 |
| Gel (%) | — | — | 0.0 |
| Mooney | — | — | — |
| Microstructure: | | | |
| 1,2 (%) | 6.5 | 8.7 | 2.9 |
| Trans-1,4 (%) | 3.6 | 4.0 | 2.0 |
| Cis-1,4 (%) | 89.7 | 87.3 | 95.0 |

EXAMPLE VI

As stated above, the Mg or Mn oleates or related carboxylic acid salts having 12–25 carbon atoms act as solvatizing agents for the Mg and Mn halides so that the combination is soluble in hexane. The procedure of Example I is repeated a number of times using MgCl$_2$-Mg oleate in place of the MgBr$_2$. In this case, two moles of oleate per mole of halide is used, and the total Mg (or Mn) content is calculated in reporting the mM phgm. The conditions and results are reported in the table below:

| RUN | 1265 | 1267 | 1270 | 1273 |
|---|---|---|---|---|
| Co decanoate (mM/phgm) | 0.06 | 0.06 | 0.06 | 0.06 |
| EtAlCl$_2$ (mM/phgm) | 5.0 | 5.0 | 5.0 | 5.0 |
| Al/Co | 83/1 | 83/1 | 83/1 | 83/1 |
| MgCl$_2$—Mg oleate (mM/phgm) | 0.18 | 0.18 | 0.18 | 0.18 |
| Mg/Co | 3/1 | 3/1 | 3/1 | 3/1 |
| Polym. Temp. (°F.) | 65–163 | 65–156 | 65–153 | 65–148 |
| Polym. Time (Hrs.) | 2 | 2 | 2 | 2 |
| Conversion (%) | 75.5 | 73.8 | 74.6 | 71.4 |
| DSV | 1.68 | 1.79 | 2.02 | 1.71 |
| Gel (%) | 0.74 | 0.0 | 0.74 | 1.5 |
| Mooney | 38.4 | 44.0 | 54.0 | 41.9 |
| Microstructure: | | | | |
| 1,2 % | 6.8 | 5.8 | 5.4 | 5.7 |
| Trans-1,4 (%) | 5.4 | 4.8 | 4.6 | 5.1 |
| Cis-1,4 (%) | 87.8 | 89.8 | 90.1 | 89.2 |

EXAMPLE VII

The procedure of Example I is repeated a number of times using MgCl$_2$-4-Mn oleate in place of the MgBr$_2$ and the butadiene concentration is changed to 14.1% in hexane. The condition and results are reported in the table below:

| RUN | 1306 | 1311 | 1314 |
|---|---|---|---|
| Co decanoate (mM/phgm) | 0.0625 | 0.03125 | 0.0156 |
| EtAlCl$_2$ (mM/phgm) | 6.25 | 6.25 | 6.25 |
| Al/Co | 100/1 | 200/1 | 400/1 |
| MgCl$_2$-4Mn oleate* (mM/phgm) | 0.094 | 0.094 | 0.094 |
| Mg/Co | 1.5/1 | 3/1 | 6/1 |
| Polym. Temp. (°F.) | 66–108 | 64–95 | 65–101 |
| Polym. Time (Hrs.) | 3.5 | 18.5** | 3.5 |
| Conversion (%) | 82.5 | 78.5 | 73.5 |
| DSV | 1.56 | 1.92 | 2.00 |
| Gel (%) | 0.0 | 0.0 | 0.0 |
| Mooney | 47.9 | 79.1 | 72.0 |
| Microstructure: | | | |
| 1,2 (%) | 2.1 | 1.7 | 1.5 |
| Trans-1,4 (%) | 5.8 | 2.2 | 1.8 |
| Cis-1,4 (%) | 92.1 | 96.0 | 96.7 |

*Four moles oleate per mole of MgCl$_2$
**Left overnight

EXAMPLE VIII

The procedure of Example I is repeated a number of times using MgCl$_2$-Mn oleate in place of the MgBr$_2$ and also varying the butadiene concentration. The conditions and results are reported in the table below:

| RUN | 1290 | 1293 | 1296 | 1303 |
|---|---|---|---|---|
| Butadiene Conc. (%) | 23.5 | 18.8 | 14.1 | 11.75 |
| Co neodecanoate (mM/phgm) | 0.056 | 0.070 | 0.094 | 0.112 |
| EtAlCl$_2$ (mM/phgm) | 3.752 | 4.69 | 6.3 | 7.5 |
| Al/Co | 67/1 | 67/1 | 67/1 | 67/1 |
| MgCl$_2$-Mn oleate (mM/phgm) | 0.056 | 0.070 | 0.094 | 0.112 |
| Mg/Co | 1/1 | 1/1 | 1/1 | 1/1 |
| Polym. Temp. (°F.) | 66–128 | 67–112 | 66–96 | 65–95 |
| Polym. Time (Hrs.) | 3.5 | 18 | 3.5 | 18 |
| Conversion (%) | 73% | 86% | 86% | 86.5% |
| DSV | 1.70 | 1.82 | 1.57 | 1.43 |
| Gel (%) | 0.0 | 0.0 | 0.0 | 0.0 |
| Mooney | 49.4 | 53.2 | 53.1 | 48.6 |
| Microstructure: | | | | |
| 1,2 (%) | 4.5 | 3.3 | 2.1 | 1.9 |
| Trans-1,4 (%) | 3.2 | 4.1 | 3.0 | 3.4 |
| Cis-1,4 (%) | 92.3 | 92.6 | 94.9 | 94.7 |

EXAMPLE IX

The procedure of Example I is repeated with results similar to those of Example I using in place of the Co decanoate equivalent amounts respectively of:
(a) CoCl$_2$-2Mg oleate
(b) Co bis (dodecanoate)

(c) Co dipicolinate-2 Mn oleate
(d) CoCl$_2$-16 N-methyl pyrrolidone
(e) Co bis(2,6-diamino-4-hydroxy-caproate)

EXAMPLE X

The procedure of Example I is repeated with results similar to those of Example I using in place of the EtAlCl$_2$ equivalent amounts respectively of:

(a) EtAlBr$_2$
(b) Isobutyl AlCl$_2$
(c) Isoamyl AlI$_2$
(d) Hexyl AlBr$_2$
(e) Phenyl AlCl$_2$
(f) Cyclohexyl AlBr$_2$

EXAMPLE XI

The procedure of Example VII is repeated with results similar to those of Example VII using in place of the MgCl$_2$-2Mn oleate equivalent amounts respectively of:

(a) MgCl$_2$-2Mn linoleate
(b) MnCl$_2$-2Mg linolenate
(c) MgBr$_2$-2Mn palmitate
(d) MnBr$_2$-2 myristolenate

EXAMPLE XII

Two experiments are performed in 28-ounce polymerization bottles maintained at the desired temperature in a bath and the contents agitated by a shaker device. The bottles are cap sealed after sweeping out with nitrogen and introduction of the butadiene-hexane blend. The caps have rubber portions through which catalyst components may be introduced by hypodermic needles. The cobalt compound used is a CoCl$_2$ complex with 16 moles of N-methyl-pyrrolidone which is designated as CoCl$_2$.16NMP.

| Run | 96-5 | 96-6 |
|---|---|---|
| Butadiene Concentration (%) | 9.4 | 9.4 |
| Millimoles Co. 16 NMP (phgm) | 0.08 | 0.08 |
| EtAlCl$_2$ (Mmoles per Mmole.Co) | 100 | 100 |
| MgCl$_2$ (Mmoles per Mmole Co) | 0 | 2 |
| Temp. (°F.) | 41° | 41° |
| Time (Hrs.) | 18 | 18 |
| Conversion (%) | 20 | 88 |
| Microstructure: | | |
| 1,2 (%) | 13.3 | 1.8 |
| Trans (%) | 6.0 | 2.8 |
| Cis (%) | 80.7 | 95.4 |
| DSV | 0.30 | 0.72 |
| Gel | 0 | 0 |

EXAMPLE XIII

The procedure of Example XII is repeated using CoCl$_2$ with Mg oleate as both the complexing agent and modifier. The proportions, conditions and results are as follows:

| Run | 98-3 |
|---|---|
| Butadiene Concentration (%) | 8.5 |
| Millimoles Co (phgm) | 0.08 |
| EtAlCl$_2$ (Mmoles per Mmole Co) | 150 |
| Mg oleate (Mmole per Mmole Co) | 0.5 |
| Temp. (°F.) | 41° |
| Time (Hrs) | 18 |
| Conversion (%) | 81 |
| Microstructure: | |
| 1,2 (%) | 1.6 |
| Trans (%) | 2.6 |
| Cis (%) | 95.8 |
| DSV | 0.94 |
| Gel | 0 |

EXAMPLE XIV

The procedure of Example XII is repeated twice using a CoCl$_2$ complex of pyridine with and without MgCl$_2$ as modifier. As will be noted in the results below, the run without the complex does not give as good conversion and molecular weight (DSV) as with the complex.

| Run | 98-5 | 98-6 |
|---|---|---|
| Butadiene Concentration (%) | 8.9 | 9.4 |
| Millimoles Co (phgm) | 0.08 | 0.08 |
| EtAlCl$_2$ (Mmoles per Mmole Co) | 150 | 150 |
| Millimoles Pyridine per Mmole CoCl$_2$ | 2 | 2 |
| Millimoles MgCl$_2$ per Mmole Co | 0 | 3 |
| Temp. (°F.) | 41° | 41° |
| Time (Hrs) | 18 | 18 |
| Conversion (%) | 76 | 92 |
| Microstructure: | | |
| 1,2 (%) | 3.3 | 2.3 |
| Trans (%) | 4.9 | 4.0 |
| Cis (%) | 91.9 | 93.8 |
| DSV | 0.38 | 0.66 |
| Gel | 0 | 0 |

The elastomeric polymers produced according to this invention may be mixed with the usual rubber compounding materials such as carbon blacks, fillers, processing oils and the like and still provide satisfactory physical properties when molded into tires and other fabricated articles. These elastomers are not only useful per se for the formation of injection moldings, compression moldings, extrusions, film coatings, spray coatings or adhesives, but also for the formation of latices from which foam or dipped goods may be prepared as well as in compositions with other rubbers for the improvement in physical properties of the latter.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A hexane-soluble catalyst composition capable of polymerizing butadiene in hexane into a high molecular weight polymer comprising:

(a) a hexane-soluble cobalt component;
(b) a reducing agent having the formula RAlX$_2$ wherein R is a hydrocarbyl radical having 1–10 carbon atoms selected from the class consisting of alkyl, carbocyclic aryl and cycloalkyl radicals and X is halogen; and
(c) MnCl$_2$, MnBr$_2$ or a Mn salt of a carboxylic acid having 12–25 carbon atoms; the RAlX$_2$ component being present in a concentration to give an Al/Co molar ratio in the range of 10/1 to 1300/1; and the Mn component being present in a concentration to give a Mn/Co molar ratio in the range of 0.25/1 to 5/1.

2. The composition of claim 1 in which said concentrations give an Al/Co molar ratio of from 50/1 to 400/1 and a Mn/Co molar ratio of from 0.5/1 to 2.1.

3. The composition of claim 1 in which said hexane-soluble cobalt component is the cobalt salt of a carboxylic acid having at least eight carbon atoms.

4. The composition of claim 1 in which said hexane-soluble component is cobalt bis(neodecanoate).

5. The composition of claim 4 in which said (c) component is $MnCl_2$.

6. The composition of claim 4 in which said (c) component is $MnBr_2$.

7. The composition of claim 4 in which said (c) component comprises Mn dioleate.

8. The composition of claim 4 in which said (c) component is a complex of $MnCl_2$, or $MnBr_2$ and of Mn dioleate.

9. The composition of claim 8 in which there are approximately two moles of said dioleate per mole of the said dichloride or dibromide.

10. The composition of claim 1 in which said reducing agent is an alkyl aluminum dichloride.

11. The process for the hexane solution polymerization of a monomer composition containing at least 70 percent by weight of a conjugated diene comprising the steps of maintaining said monomer at a temperature of 32°–220° F. and in intimate contact with the catalyst composition comprising:
   (a) a hexane-soluble cobalt component:
   (b) a reducing agent having the formula $RAlX_2$ wherein R is a hydrocarbyl radical having 1–10 carbon atoms selected from the class consisting of alkyl, carbocyclic aryl and cycloalkyl radicals and X is halogen; and
   (c) $MgCl_2$, $MgBr_2$, $MnCl_2$, $MnBr_2$ or a Mg or Mn salt of a carboxylic acid having 12–25 carbon atoms; the $RAlX_2$ component being present in a concentration to give an Al/Co ratio in the range of 10/1 to 1300/1; and the Mg or Mn component being present in a concentration to give a Mg/Co or Mn/Co ratio in the range of 0.25/1 to 5/1, said cobalt component being present in a concentration of 0.005–1.0 millimoles per 100 grams of monomer.

12. The process of claim 11 in which said diene is butadiene-1,3.

13. The process of claim 11 in which said monomer composition is substantially all butadiene-1,3.

14. The process of claim 13 in which said cobalt component concentration is in the range of 0.02 to 0.1 millimoles per hundred grams of monomer.

15. The process of claim 13 in which said cobalt component is the cobalt salt of a carboxylic acid having at least eight carbon atoms.

16. The process of claim 13 in which said cobalt salt is cobalt bis(neodecanoate).

17. The process of claim 16 in which said reducing agent is an alkyl aluminum dichloride.

18. The process of claim 13 in which said reducing agent is an alkyl aluminum dichloride.

19. The process of claim 13 in which said reducing agent is ethyl aluminum dichloride.

20. The process of claim 11 in which said reducing agent is an alkyl aluminum dichloride.

21. The process of claim 11 in which said reducing agent is ethyl aluminum dichloride.

22. The process of claim 13 in which said cobalt compound is a $CoCl_2$ complex with N-methylpyrrolidone.

23. The process of claim 22 in which said reducing agent is ethyl aluminim dichloride.

24. The process of claim 13 in which said cobalt compound is a $CoCl_2$ complex with pyridine.

25. The process of claim 24 in which said reducing agent is ethyl aluminum dichloride.

* * * * *

UNITED STATES PATENT AND TRADEMARK OFFICE
CERTIFICATE OF CORRECTION

PATENT NO. : 4,198,496
DATED : April 15, 1980
INVENTOR(S) : Adel F. Halasa and James E. Hall It is certified that error appears in the above-identified patent and that said Letters Patent are hereby corrected as shown below:

Column 5, line 48

"Mg and Mn" should read -- Mg or Mn --

Column 5, line 51

"$MgX_2$ and $MnX_2$" should read -- $MgX_2$ or $MnX_2$ --

Signed and Sealed this

Eleventh Day of November 1980

[SEAL]

Attest:

SIDNEY A. DIAMOND

Attesting Officer

Commissioner of Patents and Trademarks